United States Patent [19]

Lepine, Jr. et al.

[11] Patent Number: 4,774,978
[45] Date of Patent: Oct. 4, 1988

[54] SAFETY MECHANISM FOR HOT-WATER DISPENSER

[75] Inventors: Raymond J. Lepine, Jr.; Roberts, Jr. Reginald F., both of Baton Rouge, La.

[73] Assignee: Louis H. Peters, Baton Rouge, La.

[21] Appl. No.: 103,949

[22] Filed: Oct. 2, 1987

[51] Int. Cl.⁴ .............................................. F16K 49/00
[52] U.S. Cl. .................................. 137/334; 137/607; 4/192; 236/12.12
[58] Field of Search ...................... 236/12.12; 137/606, 137/607, 334, 337, 468; 4/192

[56] References Cited

U.S. PATENT DOCUMENTS

| 2,708,551 | 5/1955 | Record | 137/606 |
| 3,455,335 | 7/1969 | Pekarek | 137/607 |
| 3,648,724 | 3/1972 | Lloyd | 137/467 |
| 3,696,996 | 10/1972 | Lloyd et al. | 236/92 |
| 3,938,741 | 2/1976 | Allison | 239/75 |
| 4,359,186 | 11/1982 | Kiendl | 236/12.12 |
| 4,420,811 | 12/1983 | Tarnay et al. | 137/607 |
| 4,563,780 | 1/1986 | Pollack | 4/192 |

FOREIGN PATENT DOCUMENTS

WO8404145 10/1984 PCT Int'l Appl. ..................... 4/192

Primary Examiner—A. Michael Chambers
Attorney, Agent, or Firm—Reginald F. Roberts, Jr.

[57] ABSTRACT

Safety mechanisms for a plumbing fixture supplying hot and cold water through a common line. One mechanism is mechanical and the other electrical. The mechanical mechanism makes use of a mechanical linkage between the hot-water valve and an auxiliary cold-water valve to flush residual hot water out of the common line with an excess of cold water. The electrical mechanism uses a microprocessor to activate the cold-water valve when the hot-water valve is shut of, this flushing the residual hot water out of the line with an excess of cold water.

6 Claims, 2 Drawing Sheets

SAFETY MECHANISM FOR HOT-WATER DISPENSER

BACKGROUND OF THE INVENTION

The present invention relates to safety mechanisms. More particularly, the invention relates to a safety mechanism for a plumbing fixture.

It is common practice to provide a common duct or pipe for hot and cold running water. This arrangement is convenient because it permits the user to choose temperatures for the water which are intermediate between those of the hot and cold water. The arrangement has an inherent disadvantage, however: it is not uncommon for a person using the fixture to be scalded or at least uncomfortably burned. The problem is that the last person using the hot water often fails to flush the common line with cold water before leaving it for the next person to use. The next person, assuming that turning on the cold-water faucet will result in cold running water leaving the common pipe, turns on the cold-water tap, places his or her hands under the common pipe, and receives a discharge of very hot water before the cold water has displaced the residual hot water left from previous use.

The prior art is replete with mechanisms for blending hot and cold water prior to discharge, and with safety devices for interrupting the flow of water above a given temperature. See, for example, U.S. Pat. Nos. 3,648,724, 3,696,996, 3,938,741, and 4,563,780. This art, however, precludes uninterrupted separate discharges of very hot and of cold water through a common spout, on demand, in a failsafe manner; and this represents a very serious disadvantage.

SUMMARY OF THE INVENTION

In general, the present invention provides a safety mechanism for avoiding the unpleasant consequences of inadvertently discharging hot water from a bathroom or kitchen fixture equipped with hot and cold running water discharging from a common line. This objective is achieved by the use of automatic means to flush residual hot water from the common line with a controlled amount of cold water. One embodiment utilizes mechanical-control means, and a second embodiment employs electrical-control means.

DESCRIPTION OF THE PREFERRED EMBODIMENTS

In a first embodiment, conduits from sources of hot and cold water lead to a common line. The conduits are provided with first and second valves which operate to control the flow of hot and of cold water, respectively. The cold-water supply is further provided with a reservoir connecting the source of cold water to the cold-water conduit. This resrevoir is connected to the cold-water supply through a third valve, and to the cold-water conduit through a fourth valve. The top of the reservoir includes a vent to maintain the interior of the reservoir at substantially atmospheric pressure. The first valve is mechanically linked to the third and fourth valves. The nature of the linkage is such that, when the first valve is opened, the third valve is opened and the fourth valve is closed. This causes the reservoir to fill with cold water. When the first valve is closed, the linkage causes the third valve to close, and the fourth valve to open. The result of these operations is that the residual hot water is flushed from the common line by the cold water contained in the reservoir.

In a second embodiment, conduits from sources of hot and cold water again lead to a common line. As in the first embodiment, the conduits are provided with first and second valves which control the flow of hot and cold water, respectively. The common line is provided with means for sensing the temperature of water flowing through the line. The temperature sensor is electrically connected to a microprocessor. The first valve is connected to a mechanical-to-electrical transducer, which is connected to the microprocessor. The second valve is connected to a servomechanism, and the servomechanism is connected to the microprocessor. The servomechanism is capable of opening and closing the second valve in response to signals from the microprocessor.

A first signal indicative of the temperature of the water flowing through the common line is sent from the temperature-sensing means, and is received by the microprocessor. When the first valve to the hot-water supply is shut off, a second signal is sent by the first valve. If the temperature of the water as sensed by the sensor is above a specified value, the second signal received by the microprocessor triggers a third signal from the microprocessor to the servomechanism, causing the servomechanism to open the second valve and thereby flush the residual hot water out of the common water line with an excess of cold water. The second valve remains open until the temperature sensed by the thermal sensor falls below a specified value, whereupon the sensor transmits a fourth signal to the microprocessor. The microprocessor then transmits a fifth signal to the servomechanism, causing the servomechanism to close the second valve.

Figure 1:
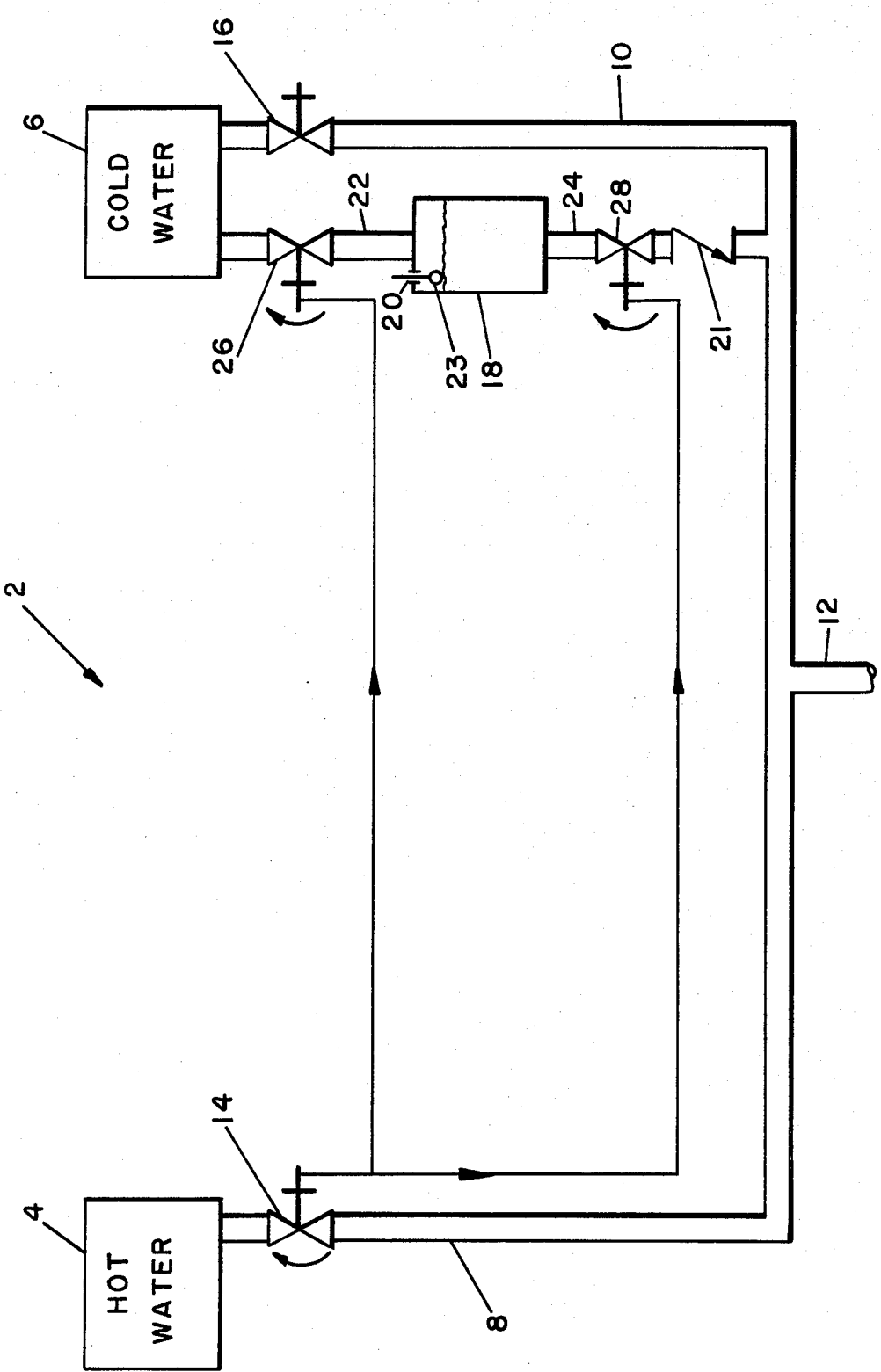
FIG. 1 is a schematic representation of a first embodiment of the present invention.

More specifically, reference is made to FIG. 1, which shows a first embodiment 2 of a safety mechanism made in accordance with the principles of the present invention. The safety mechanism 2 comprises sources of hot and cold water 4 and 6, respectively. The source of hot water may, for example, be a hot-water heater; the source of cold water is usually a utility line which delivers water to a building or residence. Conduits 8 and 10 from the hot and cold water supplies, respectively, discharge into a common line 12.

The conduits 8 and 10 are provided with first and second valves 14 and 16 for controlling the flow of hot and cold water, respectively. The cold-water supply 6 is further provided with a chamber 18 which acts as a reservoir for cold water. The top of the reservoir 18 includes an opening 20 which vents the chamber to atmospheric pressure. The chamber 18 is connected to the cold-water supply 6 through a third valve 26, and to the cold-water line 10 through a fourth valve 28. Lines 22 and 24 connect the chamber 18 to the third and fourth valves 26 and 28, respectively.

The first valve 14 is mechanically linked to the third and fourth valves 26 and 28. The nature of the linkage is such that, when the first valve 14 is opened, the third valve 26 is opened and the fourth valve 28 is closed. This causes the chamber 18 to fill with cold water. When the first valve 14 is closed, the linkage causes the third valve 26 to close, and the fourth valve 28 to open. The result of these operations is that the residual hot water remaining in the line 12 from the opening of the first valve 14 is flushed from the line 12 by the cold water collected in the chamber 18.

The particular type of mechanical linkage which is used to connect the valves 14, 26, and 28 is not critical. Many different ways of performing this function are well known in the art. A simple way would be to provide teeth for the stem of each valve, thereby transforming the stem into a gear. The gears could then be engaged directly or through a gear train. If the stems are to turn in the same direction, at least one more gear would be used to connect the stems.

To prevent backup of cold water from conduit 10 through line 24 into the chamber 18, a check-valve 21 is installed in line 24 between line 10 and the fourth valve 28. To prevent overflow from the chamber 18, the chamber is beneficially provided with a ball-check 23.

Figure 2:
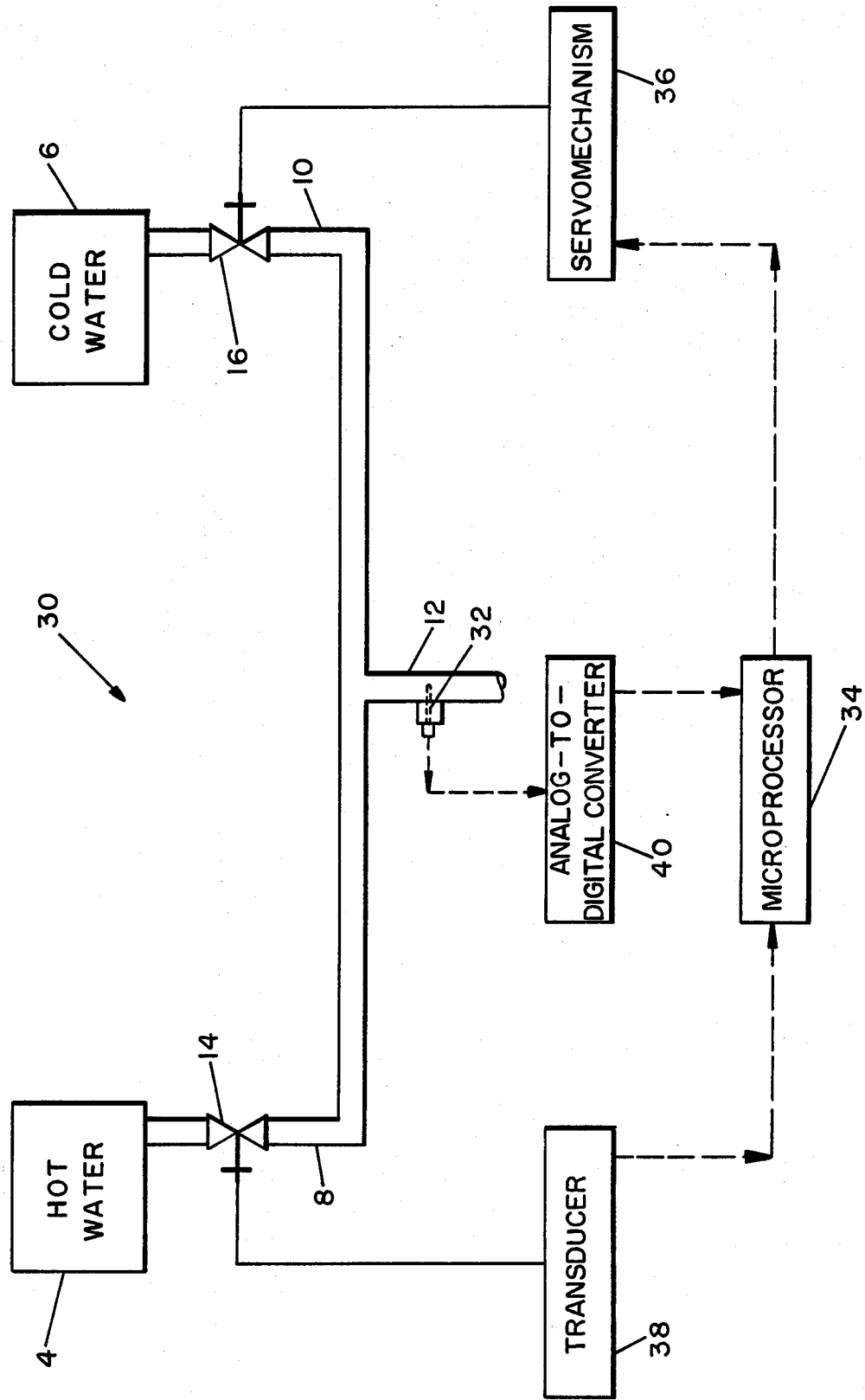
FIG. 2 is a schematic representation of a second embodiment of the invention.

Reference is now made to FIG. 2, which shows a second embodiment 30 of a safety mechanism made in accordance with the principles of the invention. As in the first embodiment 2, this second embodiment 30 includes sources 4 and 6 of hot and cold water, respectively, and conduits 8 and 10 leading therefrom to a common line 12. The conduits 8 and 10 are provided as before with first and second valves 14 and 16 for controlling the flow of hot and cold water, respectively. The common line 12 is provided with means for sensing the temperature of water flowing therethrough. Preferably, the sensing means include a thermocouple 32 which communicates with a microprocessor 34. The first valve 14 likewise communicates with the microprocessor 34. The second valve 16 is connected to a servomechanism 36 which is capable of opening and closing the second valve 16 in response to signals from the microprocessor 34. If the servomechanism 36 is an electric motor, the connection between the second valve 16 and the servomechanism is mechanical. If the servomechanism 36 is a solenoid, the connection is electrical. In either case electrical energy is supplied to the servomechanism 36 by an auxiliary source of electrical power (not shown).

The microprocessor 34 is programmed to receive first, second, and fourth electrical signals; and to send or transmit third and fifth electrical signals. A mechanical-to-electrical transducer 38 converts a mechanical force from the first valve 14 into an electrical signal, which is then transmitted to the microprocessor. The mechanical force originates as a torque when the first valve 14, or more specifically the handle and stem of the first valve 14, is turned. This torque is transmitted mechanically to the transducer 38, to which it is mechanically linked, and the transducer 38 converts the mechanical force into an electrical signal which it then transmits to the mnicroprocessor 34. An analog-to-digital converter 40 converts the temperature sensed by the thermocouple as an electrical potential into a numerical value, which is then input as an electrical signal to the microprocessor 34. The transducer 38 may, for example, be an electrical switch which is opened or closed by the closing or opening of the first valve 14. The switch would be connected to a source of electricity (not shown). Microprocessors, transducers, and converters are well known in the art, are commercially available, and can be installed, connected, and programmed by any competent electronics technician.

The operation of the safety mechanism 30 is as follows. A first signal, indicative of the temperature of the water flowing through the common line 12, is sent from the thermocouple 32, and is received by the microprocessor 34 via the converter 40. When the first valve 14 to the hot-water supply 4 is shut off, a second signal is sent by the first valve 14 via the transducer 38 to the microprocessor 34. If the temperature of the water as sensed by the thermocouple 32 is above a particular value—e.g., 40° C.—the second signal received by the microprocessor 34 triggers a third signal from the microprocessor 34 to the servomechanism 36, causing the servomechanism 36 to open the second valve 16 and thereby flush the residual hot water out of the common water line 12 with an excess of cold water. The cold-water valve 16 remains open until the water temperature sensed by the thermocouple 32 falls below a certain value; e.g., 30° C., whereupon the thermocouple 32 transmits a fourth signal to the microprocessor 34. The microprocessor 34 then transmits a fifth signal to the servomechanism 36, which causes the servomechanism 36 to close the cold-water valve 16.

We claim:

1. A safety mechanism for a plumbing fixture which discharges hot and cold running water from a common line, comprising:
   (a) automatic means for flushing residual hot water from the common line with a controlled amount of cold water, said automatic means including
   (b) first and second valves for controlling the flow of hot and cold water from sources of hot and cold water, respectively;
   (c) a reservoir for collecting a quantity of cold water;
   (d) means for maintaining the interior of the reservoir at substantially atmospheric pressure;
   (e) a third valve connecting the reservoir to the source of cold water;
   (f) a fourth valve connecting the reservoir to the common line; and
   (g) a mechanical linkage means between the first valve and the third and fourth valves, the linkage means characterized as causing the third valve to open and the fourth valve to close when the first valve is opened, and causing the third valve to close and the fourth valve to open when the first valve is closed.

2. A safety mechanism for a plumbing fixture which discharges hot and cold running water from a common line, comprising:
   (a) automatic means for flushing residual hot water from the common line with a controlled amount of cold water, said automatic means including
   (b) first and second valves for controlling the flow of hot and cold water from sources of hot and cold water, respectively;
   (c) means for sensing the temperature of water flowing through the common line;
   (d) a microprocessor programmed to receive and transmit electrical signals;
   (e) a servomechanism for operating the second valve;
   (f) means for transmitting a first signal, indicative of the temperature sensed by the temperature-sensing means, from the temperature-sensing means to the microprocessor;
   (g) means for transmitting a second signal, indicative of the closing of the first valve, from the first valve to the microprocessor;

(h) means for transmitting a third signal, indicative of an elevated temperature sensed by the thermal-sensing means, from the microprocessor to the servomechanism, the third signal characterized as sufficient to cause the servomechanism to open the second valve, thereby flushing residual hot water from the common line with an excess of cold water;

(i) means for transmitting a fourth signal, indicative of a lower temperature, from the temperature-sensing means to the microprocessor; and (j) means for transmitting, in response to the fourth signal, a fifth signal from the microprocessor to the servomechanism, the fifth signal characterized as being sufficient to cause the servomechanism to close the second valve.

3. The mechanism of claim 2, wherein the servomechanism is an electrical motor.

4. The safety mechanism of claim 2, wherein the servomechanism is a solenoid.

5. The safety mechanism of claim 2, wherein the means for transmitting the second signal include means for converting a mechanical signal into an electrical signal; and the means for transmitting the third and fourth signals include an analog-to-digital converter.

6. A safety mechanism for a plumbing fixture which discharges hot and cold running water from a common line, comprising:

(a) automatic means for flushing residual hot water from the common line with a controlled amount of cold water, said automatic means including (b) first and second valves for controlling the flow of hot and cold water, respectively;

(c) a reservoir for collecting a quantity of cold water;

(d) means for maintaining the interior of the reservoir at substantially atmospheric pressure;

(e) a third valve connecting the reservoir to the source of cold water;

(f) a fourth valve connecting the reservoir to the common line;

(g) means for causing the third valve to open and the fourth valve to close when the first valve is opened; and (h) means for causing the third valve to close and the fourth valve to open when the first valve is closed.

* * * * *